(12) United States Patent
Velamakanni et al.

(10) Patent No.: US 8,801,571 B2
(45) Date of Patent: Aug. 12, 2014

(54) MACHINE POWERTRAIN AND METHOD

(75) Inventors: Sairam Velamakanni, Peoria, IL (US);
Aaron Ho, Peoria, IL (US); Catrina Swan, East Peoria, IL (US); Warren Pepper, Peoria, IL (US); Douglas Carlson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 428 days.

(21) Appl. No.: 13/305,549

(22) Filed: Nov. 28, 2011

(65) Prior Publication Data
US 2013/0137548 A1     May 30, 2013

(51) Int. Cl.
*B60W 10/04* (2006.01)

(52) U.S. Cl.
USPC ............ 477/107; 477/111; 701/101; 701/102

(58) Field of Classification Search
USPC ............................ 477/107, 111; 701/101, 102
See application file for complete search history.

(56) References Cited

U.S. PATENT DOCUMENTS

| | | | |
|---|---|---|---|
| 4,411,174 A | 10/1983 | Yokoi et al. | |
| 5,651,752 A * | 7/1997 | Wakahara et al. | 477/181 |
| 5,879,266 A * | 3/1999 | Sawamura et al. | 477/62 |
| 6,095,117 A * | 8/2000 | Minowa et al. | 123/399 |
| 7,901,321 B2 * | 3/2011 | Ferrier et al. | 477/64 |
| 8,500,599 B2 * | 8/2013 | Ho et al. | 477/107 |
| 2005/0197236 A1 | 9/2005 | Doering | |
| 2006/0042241 A1 * | 3/2006 | Bright et al. | 60/431 |
| 2009/0000292 A1 * | 1/2009 | Schifferer et al. | 60/423 |

FOREIGN PATENT DOCUMENTS

| | | |
|---|---|---|
| JP | 62026132 | 2/1987 |
| JP | 2011202531 | 10/2011 |
| KR | 1019970070667 | 11/1997 |

* cited by examiner

*Primary Examiner* — Derek D Knight
(74) *Attorney, Agent, or Firm* — LEydig, Voit & Mayer, Ltd.

(57) ABSTRACT

A machine powertrain includes an engine operably connected to a torque converter and a transmission. A switch associated with the torque converter provides a locking signal indicative of a locked or unlocked condition of the torque converter. A throttle sensor associated with the throttle provides a throttle signal. An electronic controller receives the locking signal and the throttle signal, and controls operation of the engine at least partially based on the throttle signal and the locking signal. The electronic controller determines whether a locked or unlocked condition of the torque converter is present based on the locking signal, determines whether a part throttle operating condition or a full throttle operating condition is present based on the throttle signal, and selects a load-control power curve when the part throttle operating condition is present and when the torque converter switches from the unlocked to the locked condition.

20 Claims, 8 Drawing Sheets

MACHINE POWERTRAIN AND METHOD

TECHNICAL FIELD

This patent disclosure relates generally to engine governors and, more particularly, to engine governors for controlling an engine in a powertrain that includes a torque converter and a transmission.

BACKGROUND

Powertrains having engines connected to transmissions via torque converters are known. Torque converters are devices, typically hydrodynamic fluid couplings, that are used to transfer rotating power from a prime mover, such as an internal combustion engine, to a rotating driven load. For land vehicles, the driven load may be a driveshaft that is connected through a differential or other gear arrangements to one or more wheels or other driving mechanisms of the vehicle.

One characteristic of torque converters is their ability to multiply torque when there is a difference between the input speed to the converter from the engine and the output speed of the converter to the transmission. Some torque converters also include a locking mechanism that transfers engine speed directly to the transmission with no substantial torque multiplication or speed variation.

When the torque converter is used in conjunction with a multiple speed transmission, the locking state of the converter during different shifts can affect the operation of the engine in terms of fuel efficiency as well as in terms of rough engine operation, especially during shifts. For certain vehicle applications, such as wheel loaders and other heavy earth moving and construction equipment, fuel efficiency and smooth engine operation are desired. In such applications, certain of which may operate at a full throttle operating condition for prolonged periods, the engagement of the locking mechanism of the torque converter may be restricted to only a few gear ratio selections of the transmission that operate at engine and transmission speeds that are sufficiently similar to avoid power variation at the ground engaging members of the machine during gear shifts. However, such limitations on the gear selections that are possible for the machine may, overall, result in increased fuel consumption of the machine.

One example of a powertrain control that addresses at least some issues associated with improving fuel efficiency and engine roughness in heavy machinery can be found in U.S. Pat. No. 7,901,321 entitled "Automatic Transmission With Part-Throttle Shifting," which issued on Mar. 8, 2011, to Ferrier et al. and is assigned on its face to Caterpillar, Inc., of Peoria, Ill. ("the '321 patent"), the contents of which are incorporated herein in their entirety by reference. Although the systems and methods disclosed in the '321 patent are useful in improving the fuel efficiency and operational smoothness of a machine, these benefits may not be realized for all gear ratios of the machine, thus not exploiting potential efficiencies. Further, engagement or disengagement of the lock-up clutch for all transmission gear ratios may cause an appreciable power variation to the wheels of the machine, especially for large machines that have engines with throttle lock controls, which means that operation of the engine is, at times, speed-control based. These and other issues may be addressed as follows.

SUMMARY

The disclosure describes, in one aspect, a machine having a powertrain. The powertrain is at least partially controlled by a throttle and includes an engine operably connected to a torque converter having a locking capability. The torque converter is connected to a transmission having one or more selectable gear ratios. The machine further includes a switch associated with the torque converter and configured to provide a locking signal indicative of a locked or unlocked condition of the torque converter. A throttle sensor is associated with the throttle and provides a throttle signal. An electronic controller is disposed to receive the locking signal and the throttle signal, and configured to control operation of the engine at least partially based on the throttle signal and the locking signal by determining whether a locked or unlocked condition of the torque converter is present based on the locking signal, determining whether a part throttle operating condition or a full throttle operating condition is present based on the throttle signal, and selecting a load-control power curve when the part-throttle operating condition is present and when the torque converter switches from the unlocked to the locked condition.

In another aspect, the disclosure describes a method for reducing power variation in a powertrain during a shift from a converter-drive mode to a direct-drive mode. The powertrain includes an engine connected to a transmission through a torque converter. The torque converter is configured to operate in an unlocked state during the converter-drive mode and in a locked state during the direct-drive mode. The transmission includes one or more selectable forward and reverse gear ratios. The engine is controlled by an electronic controller. The method includes providing a locking signal indicative of a locked or unlocked condition of the torque converter, and providing a throttle signal indicative of an engine throttle command. The locking and throttle signals are received in the electronic controller and the operation of the engine is controlled at least partially based on the locking and throttle signals. In this way, it is determined whether a locked or unlocked condition of the torque converter is present based on the locking signal, and whether a part throttle operating condition or a full throttle operating condition is present based on the throttle signal. A load-control power curve is then selected for the part throttle operating condition when the torque converter switches from the unlocked condition to the locked condition.

In yet another aspect, the disclosure describes a method for reducing power variation in a powertrain during a locking of a torque converter. The powertrain includes an engine connected to a transmission through the torque converter. The transmission has one or more selectable forward and reverse gear ratios. The engine is controlled by an electronic controller. The method includes operably arranging a processor with a data storage device and a communication channel. A locking signal indicative of a locked or unlocked condition of the torque converter is provided over the communication channel. Further, a throttle signal indicative of an engine throttle command is provided over the communication channel. The processor executing computer executable instructions stored on a tangible computer-readable medium is employed to implement processes. The processes include determining whether a locked or unlocked condition of the torque converter is present based on the locking signal, determining whether a part throttle operating condition or a full throttle operating condition is present based on the throttle signal, and selecting a load-control power curve for the part throttle operating condition when the torque converter switches from the unlocked to the locked condition.

DETAILED DESCRIPTION

This disclosure generally relates to vehicle powertrains having automatic transmissions and, more particularly, to powertrains that include automatic transmissions and torque converters capable of directly and selectively linking the output of an engine with the transmission at any gear setting of the transmission. The exemplary embodiment illustrated and described herein relates to a wheel loader, but it should be understood that the systems and methods disclosed have universal applicability and are suited for other types of vehicles, such as on- and off-highway trucks, backhoe loaders, compactors, harvesters, graders, tractors, pavers, scrapers, skid steer and tracked vehicles, and other vehicles.

Figure 1:
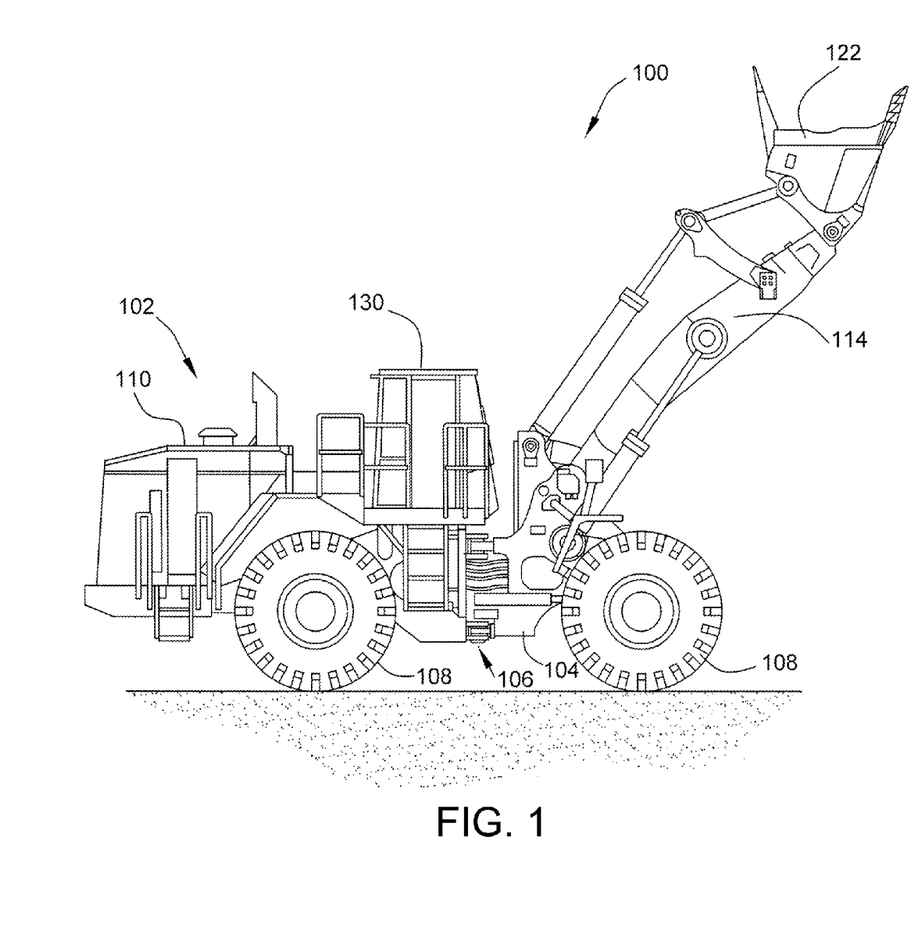
FIG. 1 is an outline view of a machine in accordance with the disclosure.
Figure 2:
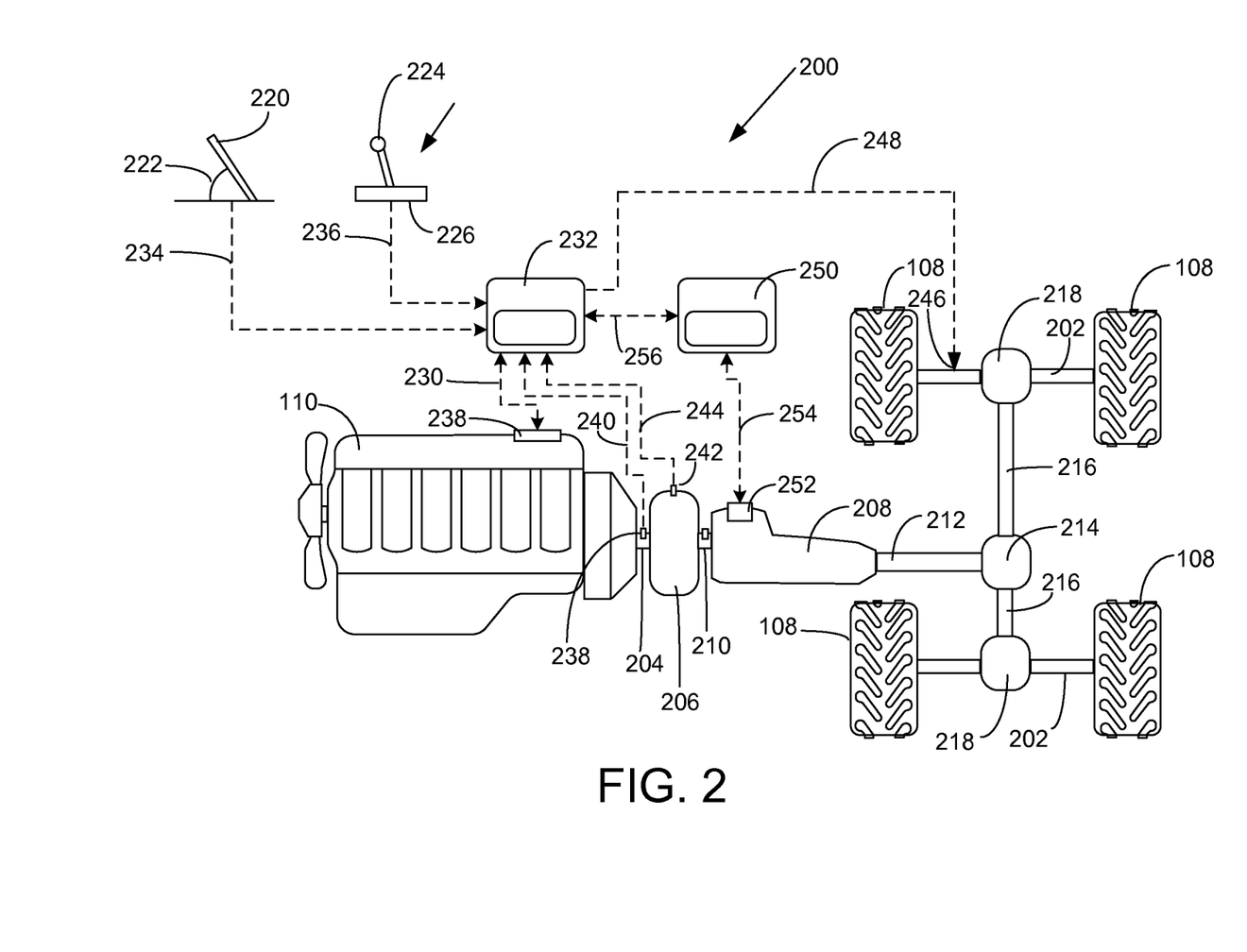
FIG. 2 is a schematic diagram of a powertrain in accordance with the disclosure.

FIG. 1 shows an outline of a wheel loader as one example for a vehicle or machine 100. FIG. 2 is a schematic of a powertrain 200 of the vehicle 100. In reference to these figures, the vehicle 100 includes an engine frame portion 102 connected to a non-engine frame portion 104 by an articulated joint 106. Each of the engine frame portion 102 and non-engine frame portion 104 includes a respective axle 202 connected to a set of wheels 108. The engine frame portion 102 includes the engine 110, which has an output shaft 204 connected to a torque converter 206. The torque converter 206 is in turn connected to a transmission 208 via a connecting shaft 210. An output shaft 212 of the transmission 208 is connected to a splitter 214 that powers two drive shafts 216, one for each axle 202. Each drive shaft 216 transmits power to the wheels 118 via a respective differential 218 such that rotational power provided at the engine output shaft 204 is effectively transmitted to the wheels 108. Although two driven axles 202 are shown, a single axle or more than two axles may be used depending on the type of vehicle used. Moreover, although wheels are shown, other types of ground engaging members, such as tracks, may be used.

The vehicle 100 further includes an operator cab 130 that houses various machine control devices. As shown in FIG. 2, such devices include an accelerator pedal 220 having an accelerator pedal sensor (APS) 222, and a gear selector lever 224 having a lever encoder 226. The APS 222 and lever encoder 226 may be configured to provide signals indicative of the desired ground speed of the vehicle 100 that is commanded by an operator during use.

Returning now to FIG. 1, the vehicle 100 of the illustrated embodiment includes a work implement, which in this case is a bucket 122 connected at the end of a pair of lift arms 114 that are pivotally connected to the non-engine frame portion 104 of the vehicle 100 at a hinge 116.

As shown in FIG. 2, the engine 110 has an interface 228 that is connected to a communication channel 230 with an engine governor 232. The engine governor 232 operates to monitor and control the function of various engine systems, such as monitor sensor readings from various engine sensors, control engine speed and load output and so forth, by receiving information and transmitting commands to various engine components through the communication channel 230. As shown, the engine governor 232, or another controller connected to the governor 232, is further connected to various vehicle components that can control the operation of the engine. In the illustrated embodiment, the governor 232 is an electronic controller that includes a processor operably associated with other electronic components such as a data storage device and the various communication channels. In the illustration of FIG. 2, a throttle communication channel 234 and a gear selection encoder communication channel 236 are connected to the governor 232 and configured to provide to the governor 232 information indicative of the operator's commands, such as the desired engine speed or load, the desired gear selection setting, and the like. It should be appreciated that additional or alternative connections between the governor 232 and the various engine and/or vehicle systems may be present but are not shown for simplicity.

The governor 232 is further configured to receive information indicative of the operation of the remaining portion of the powertrain 200. In this way, the governor 232 is connected to an engine output shaft speed sensor 238 via an engine speed communication channel 240, a torque converter locked state sensor 242 via a torque converter communication channel 244, and to a vehicle ground speed sensor 246 via a ground speed communication channel 248.

The powertrain 200 in the illustrated embodiment includes a transmission controller 250 that is configured to control the operation of the transmission 208. Accordingly, the transmission controller 250 is connected to an interface 252 of the transmission 208 via a transmission communication channel 254. The interface 252 may include structures that can selectively engage and disengage various gear sets of the transmission 208 in response to commands from the transmission controller 250, as well as provide information to the transmission controller 250 indicative of the current gear engagement state of the transmission 208 as well as other information, such as the power transmitted to the wheels 108 through the transmission 208, the speed of the output shaft 212, the speed of the connecting shaft 210, and the like. During operation, the transmission controller 250 may command gear changes to the transmission 208 based on predetermined connecting shaft 210 speed thresholds for upshift and downshift changes.

In the illustrated embodiment, information may be exchanged between the engine governor 232 and the transmission controller 250 via a data bus 256, but it should be appreciated that although the engine governor 232 and the transmission controller 250 are shown as separate components they may alternatively be integrated into a single control unit or separated into more than two control units. Thus, either of the engine governor 232 and/or the transmission controller 250 may be a single controller or may include more than one controller disposed to control various functions and/or features of a machine. For example, a master controller, used to control the overall operation and function of the machine, may be cooperatively implemented with a motor or engine controller, used to control the engine 110. In this embodiment, the terms "controller" or "governor" are meant to include one, two, or more controllers that may be associated with the machine 100 and that may cooperate in controlling various functions and operations of the machine 100 (FIG. 1). The functionality of these devices, while shown conceptually in the figures that follow to include various discrete functions for illustrative purposes only, may be implemented in hardware and/or software without regard to the discrete functionality shown. Accordingly, although various interfaces of the controller are described relative to components of the powertrain system in the figures that follow, such interfaces are not intended to limit the type and number of components that are connected, nor the number of controllers that are described.

Figure 3:
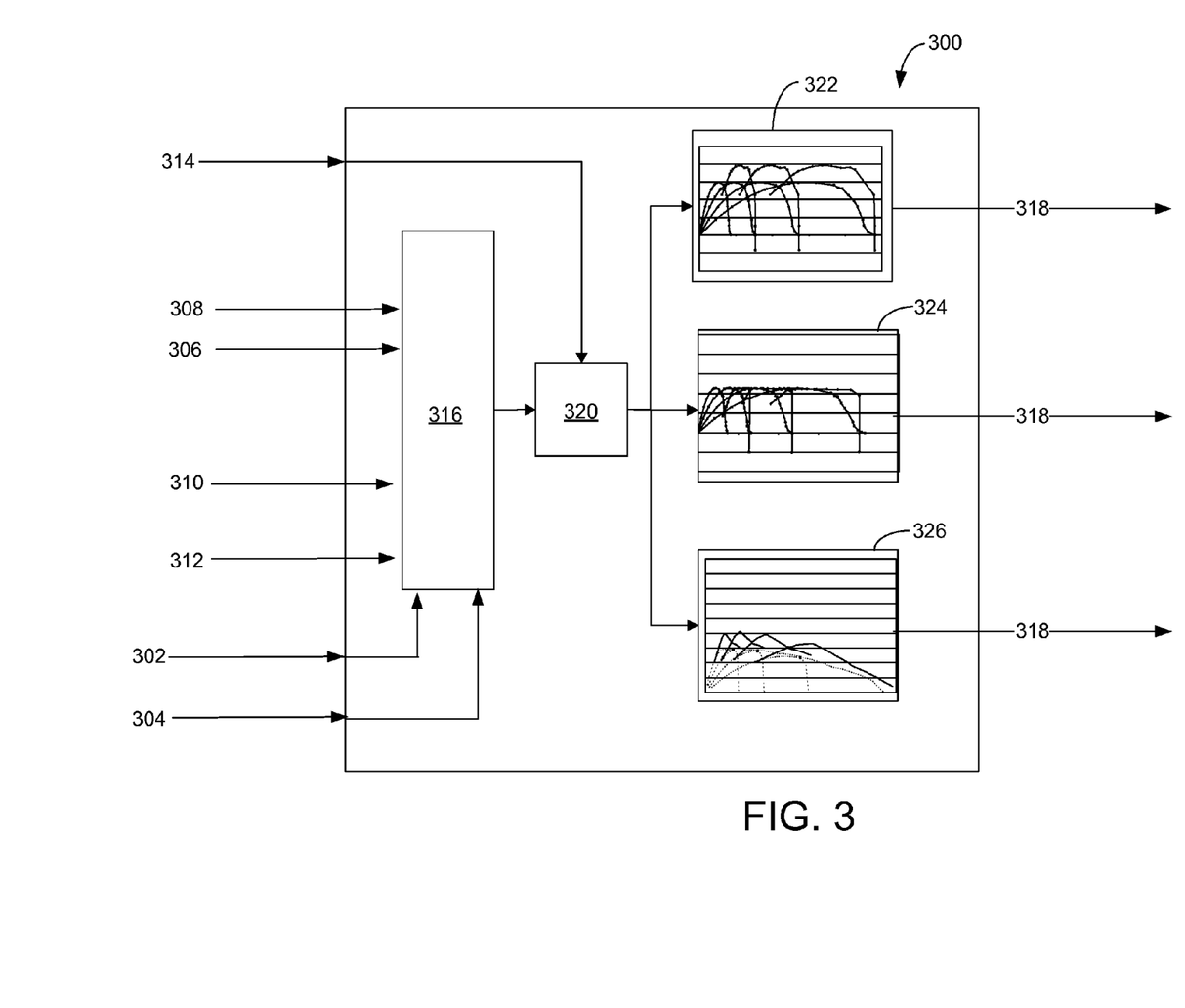
FIG. 3 is a block diagram of a control in accordance with the disclosure.

A block diagram of an engine control 300 is shown in FIG. 3. The control 300 may be operating within the engine governor 232 as shown in FIG. 2, but may alternatively be operating in another controller. The engine control 300 may further be operating in conjunction or cooperation with other control schemes or algorithms, which are not shown for simplicity. Relative to the present disclosure, the engine control 300 operates to select an appropriate set of engine power curves depending on the type of machine operation and also depending on the operating state of the transmission and torque converter. More specifically, the engine control 300 receives various operating parameters of the machine, including the engine 110, torque converter 206 and transmission 208, which are indicative of the current operating state of the powertrain 200. In the exemplary embodiment shown in FIG. 3, parameters indicative of the operating state of the engine 110 include engine speed (RPM) 302 and engine load 304. Parameters indicative of the operating state of the torque converter 206 and transmission 208 include the lock state 306 of the torque converter 206 and the current gear ratio 308 engaged in the transmission 208, while parameters indicative of the operation of the machine in general are provided by a throttle setting 310, a ground speed 312, and a manual or automatic shifting mode indicator 314, which represents a manual or automatic shifting setting by the machine operator. Although certain parameters are shown in the block diagram of FIG. 3, additional parameters may also be used as appropriate.

In reference now to FIG. 3, the engine speed and load inputs 302 and 304 may be signals acquired or provided to the control 300 from the engine governor 232 via the engine communication channel 230. The engine speed 302 may represent the current or desired engine speed, for example, in revolutions per minute (RPM), while the engine load 304 may represent the current, predicted or expected loading of the engine expressed in units of power, such as horsepower (hp). The lock state 306 of the torque converter 206 may be a binary value indicative of the locked or unlocked state between the input and output shafts of the torque converter 206. The current gear ratio 308 may be a signal indicative of the current gear setting of the transmission 208 that is either currently engaged or that will be engaged after an up-shift or down-shift gear change is carried out. In the illustrated embodiment, the current gear ratio 308 used in the control 300 may be an integer representing the selected one of four possible gear ratios of the transmission 208 and may include a further designation such as "CD" or "DD" that represents, respectively, the unlocked or locked state of the torque converter 206 as provided by the lock state 306 signal. In this way, for example, engagement of a third gear of the transmission 208 when the torque converter 206 is unlocked may be designated as "3CD," while the directly driven third gear when the torque converter is locked, for example, when a locking clutch is engaged, may be designated as "3DD" and so forth. These gear designations will be used in the description that follows but it should be appreciated that designation of the locked state of the torque converter may be omitted from the current gear ratio 308 indication and be provided as the separate signal or parameter 306 in the control 300. Additional designations indicative of the forward or reverse travel direction of the machine may also be used but are not discussed herein in detail for simplicity.

The control 300 includes an operating state selector function 316, which receives various inputs to determine an appropriate engine torque curve for use when shifting between converter drive and direct drive operating modes of the powertrain 200. More specifically, successive gear selections may include gear settings of the transmission that are activated either through the torque converter in a converter-drive operating mode ("CD") or, when the torque converter is locked, directly from the engine in a direct-drive operating mode ("DD"). In the illustrated embodiment, the up-shift and down-shift sequences for the powertrain 200 may be:

1CD→2CD→2DD→3CD→3DD→4CD→4DD (up-shift)

4DD→4CD→3DD→3CD→2DD→2CD→1CD (down-shift)

where the numbers 1-4 represent the gear setting of the transmission, "CD" represents the converter-drive mode when the torque converter is unlocked, and "DD" represents the direct-drive mode when the torque converter is locked. As can be seen from these shift sequences, the unlocked torque converter may operate as a bridge between certain successive gear ratios of the transmission in an up-shift and a down-shift direction along the exemplary shift sequence presented. When switching between locked and unlocked states, the power variation from the engine to the transmission through the torque converter may be large enough to cause rough machine operation. A family of torque curves to illustrate this power variation in one exemplary operating condition is shown in FIG. 4.

Figure 4:
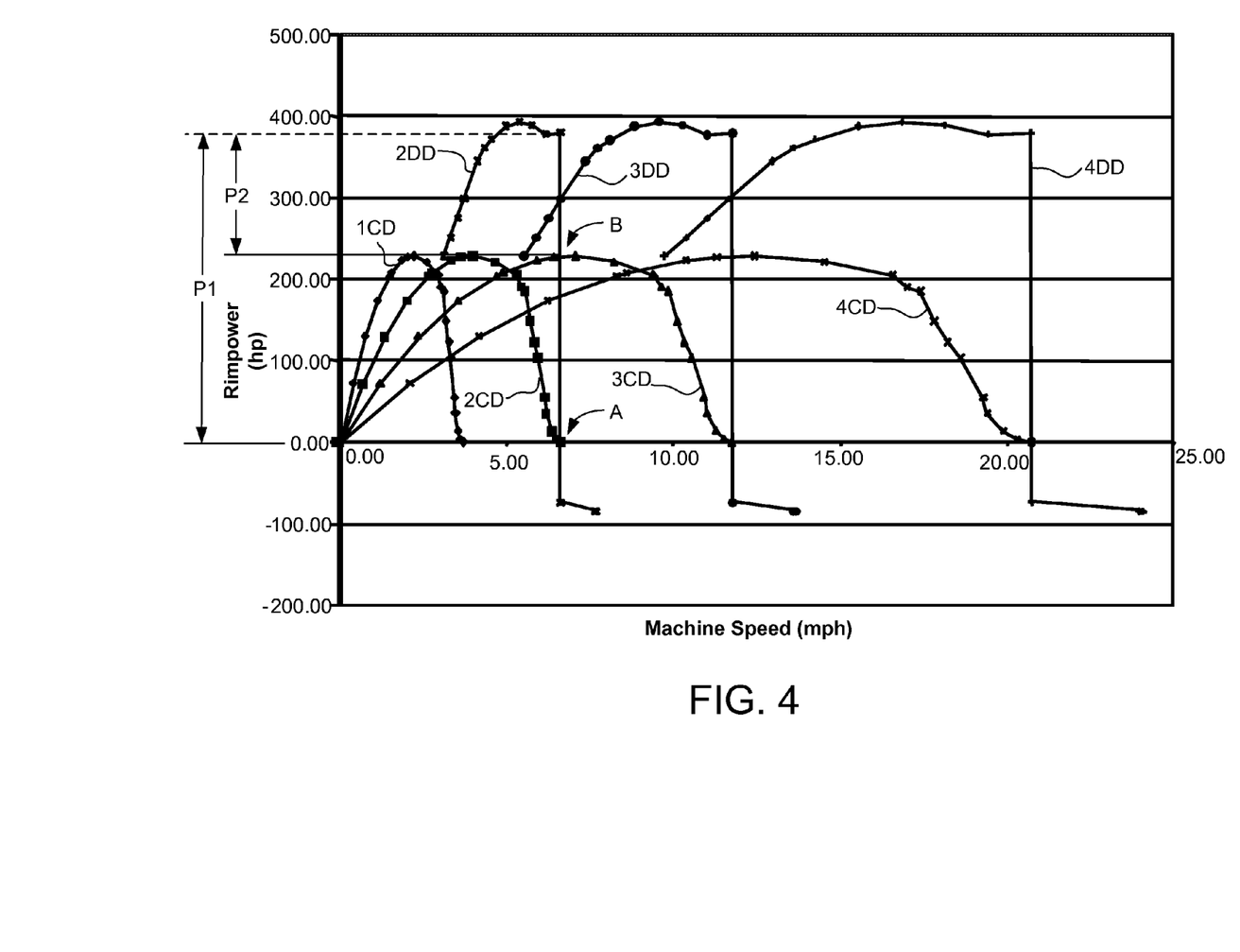
FIG. 4 is a graph illustrating a baseline part-throttle operating condition.

FIG. 4 is a graph illustrating a family of engine power curves at about a 60% throttle setting for each gear ratio and torque converter lock condition in the shift sequences discussed above. The power curves shown in FIG. 4 are plotted against machine ground speed in miles per hour (mph) and rim power expressed in horsepower units (hp). As can be seen from the graph of FIG. 4, shifting from an unlocked converter drive in the second gear (2CD) to a locked converter drive or direct drive operation in that same gear (2DD) at the point, A, of intersection of those two curves according to the shift sequence, a power variation, P1, results. In another example, shifting from the second gear in direct drive mode (2DD) to the third gear in the unlocked converter drive mode (3CD) at an intersection point, B, will cause a further power variation, P2. It has been found that the power variations P1 and P2, as well as other power variations that exist between different gear ratios during up-shift and down-shift events, can be abrupt during movement of the machine because the corresponding power curves for the different gear ratios intersect at obtuse or even right angles, as can be seen in FIG. 4.

Figure 5:
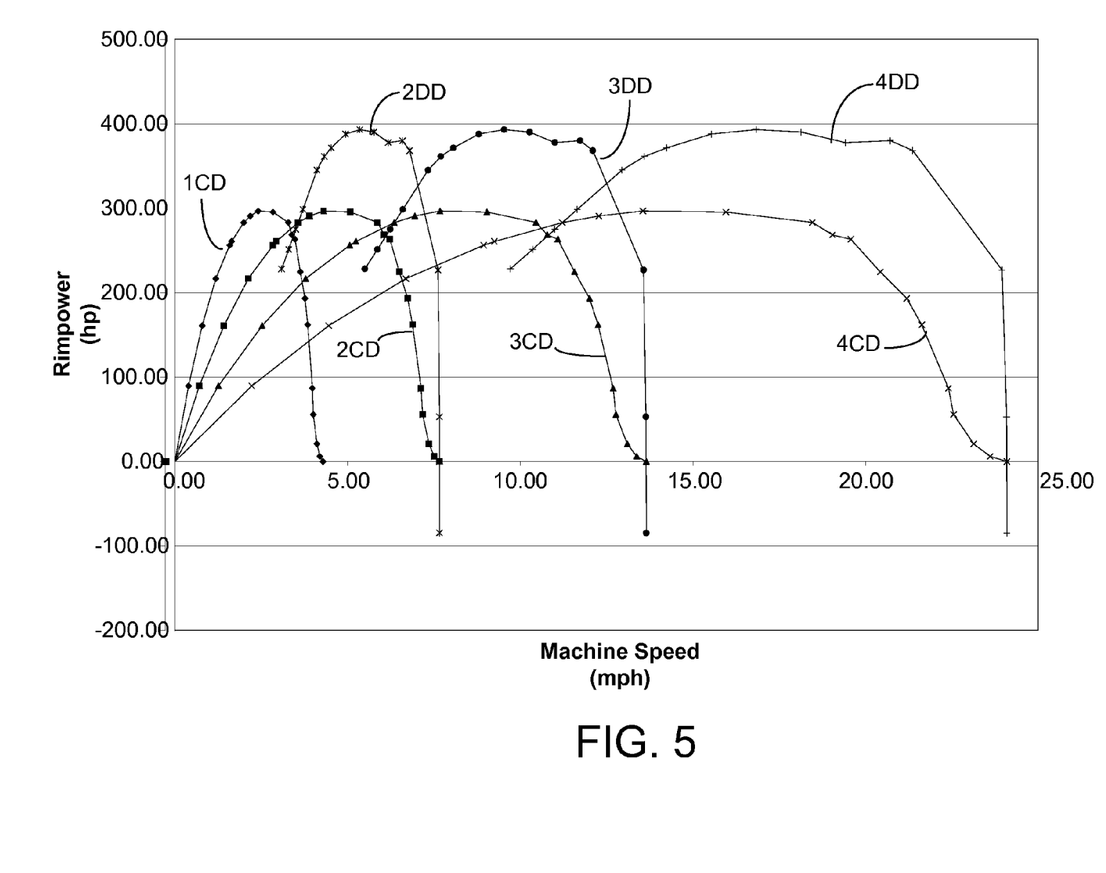
FIG. 5 is a graph illustrating a full-throttle operating condition in accordance with the disclosure.

Apart from the power variations that can occur when shifting at part throttle operating conditions, various applications may also have different requirements during operation in a direct drive mode. For example, some machines such as large wheel loaders and the like may operate in a speed-control fashion, which means that the machine operator controls the machine by setting a desired engine speed, while other machines such as automobiles or medium-size loaders and the like may operate in a load-control fashion, which means that the operator controls the machine by setting a desired engine load or power output setting. Both speed-control and load-control machines may operate in a similar fashion at full throttle, because the engine will output a maximum power under those conditions. An exemplary graph that includes a family of curves for full throttle operation is shown in FIG. 5. As before, FIG. 5 represents a curve for each of the gear ratios previously discussed, which have been plotted against ground speed expressed in miles per hour (mph) along the horizontal axis and rim power expressed in horsepower (hp) along the vertical axis. When the graphs in FIGS. 4 and 5 are compared, it can be seen that although operation in direct-drive (DD) mode is quite similar regardless of the throttle setting, operation in converter-drive mode (CD) at various gear settings will change depending on the throttle setting.

For speed-control machines, operation at part throttle operating conditions may require engine operation at varying loads but at a preselected engine speed. Similarly, for load-control machines, operation at part throttle operating conditions may require engine operation at varying engine speeds but at a preselected engine power output. Operation in both types of machines, however, as seen when comparing FIGS. 4 and 5, will not change when in direct-drive mode. Further, regardless of the engine speed or power requirements of the different machine applications, the power variation when shifting at part throttle operating conditions can still result in rough operation as discussed above, which can be addressed as discussed further below.

Figure 6:
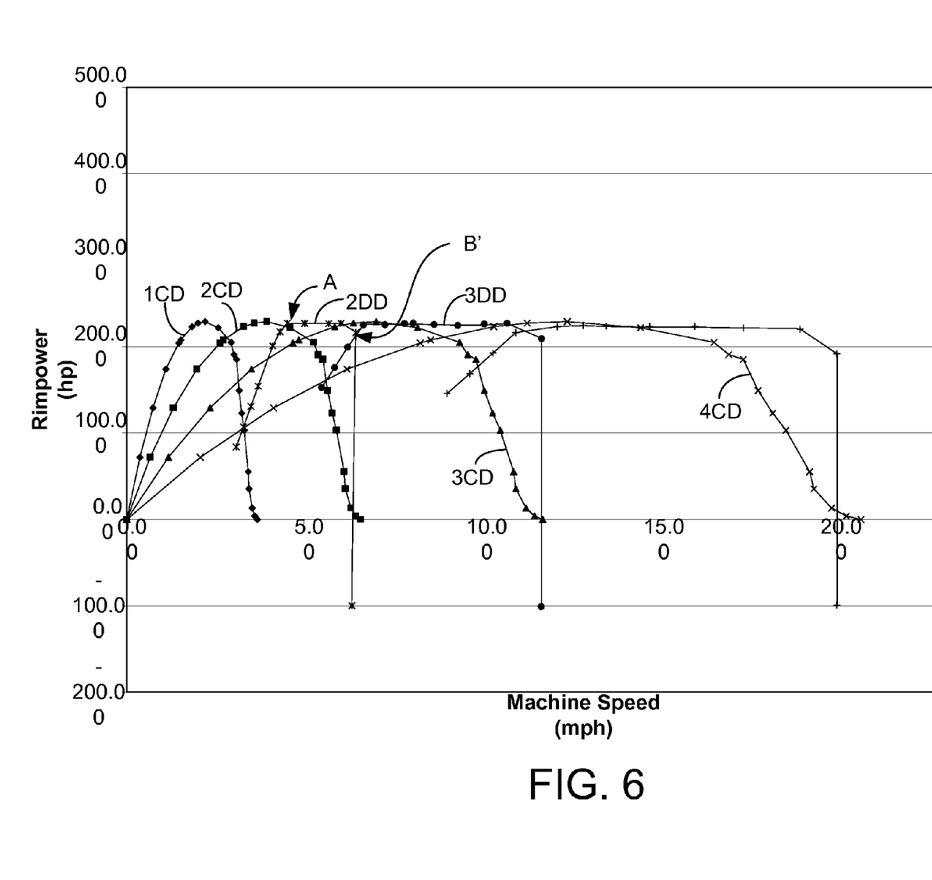
FIG. 6 is a graph illustrating a derated power curve for a part-throttle operating condition in accordance with one embodiment of the disclosure.

In one embodiment of the present disclosure that is well suited for speed-control machines, engine power can be derated when the machine is operating in direct-drive mode, as shown in the graph of FIG. 6. FIG. 6 represents a family of power curves for a part throttle operating condition of about 60% in accordance with the disclosure, in which the maximum engine power or rim power is limited in direct-drive mode to ensure that power variations when shifting from converter-drive mode to direct-drive mode and vice versa is minimized. More specifically, a curve for each gear ratio at each the converter-drive (CD) mode and direct-drive (DD) mode is presented. As in the graphs in FIGS. 4 and 5, the graph of FIG. 6 is plotted against ground speed in miles per hour (mph) along the horizontal axis and rim power expressed in horsepower (hp) along the vertical axis. As can be seen from the graph, in which the various drive gear ratios are denoted, the curves representing the direct-drive gears (2DD, 3DD and 4DD) have been truncated to a power level that is comparable to a rim power level of the converter-drive gears (1CD, 2CD, 3CD and 4CD). The similarities and differences between the derated family of curves shown in FIG. 6 and the baseline family of curves for the part throttle operating condition shown in FIG. 4 can be appreciated when the two graphs are compared.

More specifically, the point of intersection "A" between the 2CD and 2DD gear ratios, which provided the power variation P1 in FIG. 4, will now provide little to no power variation as can be seen in FIG. 6. Similarly, the point of intersection "B" between the 2DD and 3CD gear ratios will also provide little to no perceptible power variation because the angles at the points of intersection between the various adjacent gear ratios are shallow.

Although reducing engine rim power when the torque converter is locked (direct-drive mode) at part throttle operating conditions, as described above, is an effective scheme for minimizing or eliminating power variation during shifts in applications where engine speed is controlled, it is not an efficient scheme under similar part throttle operating conditions for applications in which engine power rather than engine speed are controlled.

Figure 7:
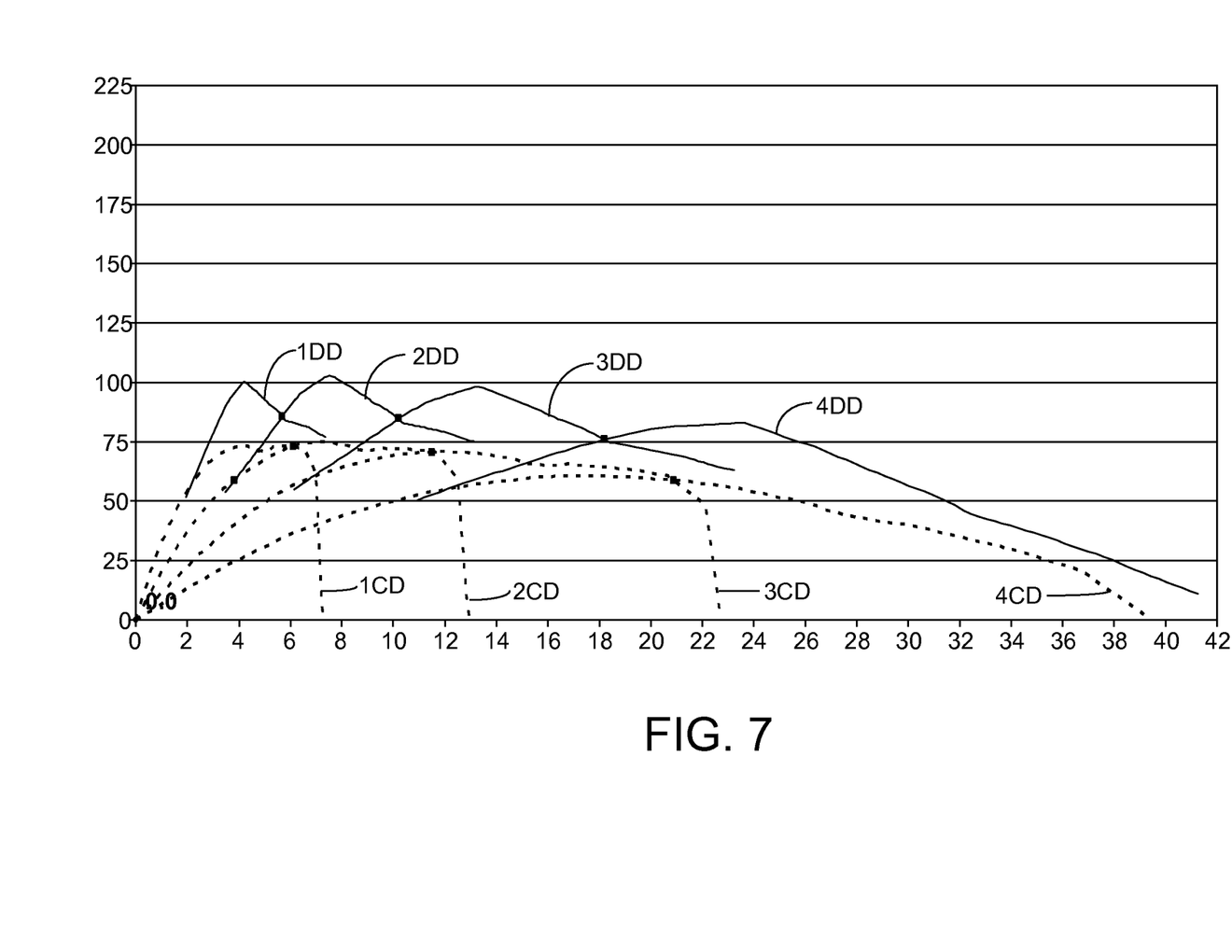
FIG. 7 is a graph illustrating a load-control power curve in accordance with an additional embodiment of the disclosure.

Accordingly, in one embodiment of the present disclosure that is better suited for load-control machines, engine power can be derated and shifted towards lower engine speeds at part throttle operating conditions, as shown in the graph of FIG. 7.

FIG. 7 represents a family of power curves for a part throttle operating condition of about 60%, in which the engine speed is allowed to fluctuate between minimum and maximum thresholds (min-max operation) while the desired power is maintained and while the torque converter is in a direct-drive mode. When the torque converter is not in direct-drive mode, i.e. when the torque converter is providing a gear ratio, then the engine is operated in a speed-control rather than a load-control mode.

Turning now to the graph of FIG. 7, it can be seen that the direct-drive curves 1DD through 4DD have a reduced overall height and do not intersect the horizontal axis. This is because in this mode of operation, engine speed is limited to be within minimum and maximum limits that, when reached, will result in the transmission performing, respectively, a down-shift or an up-shift gear change. Thus, during operation, in machines that require load-control when the torque converter is in direct-drive mode, engine control will switch between speed-control and load-control modes as the torque converter switches in and out of direct-drive mode.

Having described machine operation at part throttle operating conditions either under power- or speed-control modes, reference is now made to the control 300 shown in FIG. 3. The control 300 includes a part throttle selector function 316 that receives the throttle signal 310 and determines, based on the magnitude of the throttle commanded, the appropriate data that the control 300 will use to control the engine. More specifically, the control 300 may include various sets of data (not shown) corresponding to particular part throttle operating conditions. For example, the control 300 may include ten sets of tables containing engine curves, each set corresponding to a 10% incremental difference of throttle setting between 0% and 100%. In this way, any throttle setting may be interpreted by the control by use of a particular data set corresponding to the particular setting or, if the throttle setting falls between two adjacent data sets, by interpolation of data contained in those two sets of data. In the illustrated embodiment, the various data sets have been omitted for simplicity and only a single data set, for example, the data set corresponding to a throttle setting of about 60%, is shown. The output of the control 300 is one or more engine commands 318, which may include a commanded engine speed and/or engine load, as appropriate.

In the illustrated embodiment, the part throttle selector function 316 determines the appropriate data set to select based, in part, on the throttle signal 310. A switching function 320, which also receives the mode signal 314, selects the appropriate family of power curves for the engine by routing appropriate parameters received by the selector function 316 to the appropriate power curve of the engine under the then present operating conditions. For example, when full or 100% throttle is commanded by the operator, as indicated by the throttle signal 310, the engine commands 318 are selected from a full throttle set of power curves 322, which may be similar to those shown and previously described relative to FIG. 5 for both speed-control and load-control based applications. When a part throttle operating condition is present, however, the switching function 320 may select the appropriate power curve based on whether the machine is operating in speed-control mode or load-control mode and, further, based on the magnitude of the part throttle commanded.

More specifically, when a part throttle command, for example, of about 60%, is provided by the operator of a speed-control machine application, the switching function 320 will select a part-throttle, speed-control derated power curve 324 that corresponds to a throttle setting of about 60%. The derated power curve 324 may be similar to the power curves shown and previously described relative to FIG. 6. In this condition, the engine commands 318 will be drawn from the derated power curve 324 such that the engine is derated when the torque converter is in a direct-drive mode, as previously discussed. The indication of the locked state of the torque converter is provided by the lock signal 306.

Similarly, for load-control machine applications that are operating at a part throttle operating condition, which for the sake of discussion is about 60%, the switching function 320 will select a part-throttle, load-control power curve 326 that corresponds to a throttle setting of about 60%. The load-control power curve 326 may be similar to the power curves shown and previously described relative to FIG. 7. In this condition, the engine commands 318 will be drawn from the load-control power curve 326 such that the engine is derated and engine power is shifted towards higher engine speeds relative to the baseline engine curves, for example, the power curves shown and previously discussed relative to FIG. 4.

When the control 300 is operating, the engine command 318 may be a particular engine speed and load that is appropriate for the particular operating condition of the machine. Therefore, the power curves 322, 324 and 326 may provide a specific engine speed and load that corresponds to the particular operating mode 314, gear selection 308, a lock signal 306 parameter that is indicative of the locking state of the torque converter 206, a throttle setting 310, and optionally the current vehicle speed 312, engine speed 302 and engine load 304. Moreover, as previously mentioned, it should be understood that although one part throttle operating condition of 60% is shown in FIG. 3, corresponding power curves for other part throttle settings are included in the control 300. These other part throttle settings, each of which includes a corresponding power curve such as the power curves 322, 324 and 326 that are shown, can be selected by the switching function 320 in the same way the power curves discussed herein are selected based on the parameters provided to the control 300.

INDUSTRIAL APPLICABILITY

The present disclosure is applicable to engine governors or other engine controller types that control engines in applications having a torque converter connected to a transmission. Two main embodiments are described herein that encompass machine applications having speed-control or load-control based engine controls.

Figure 8:
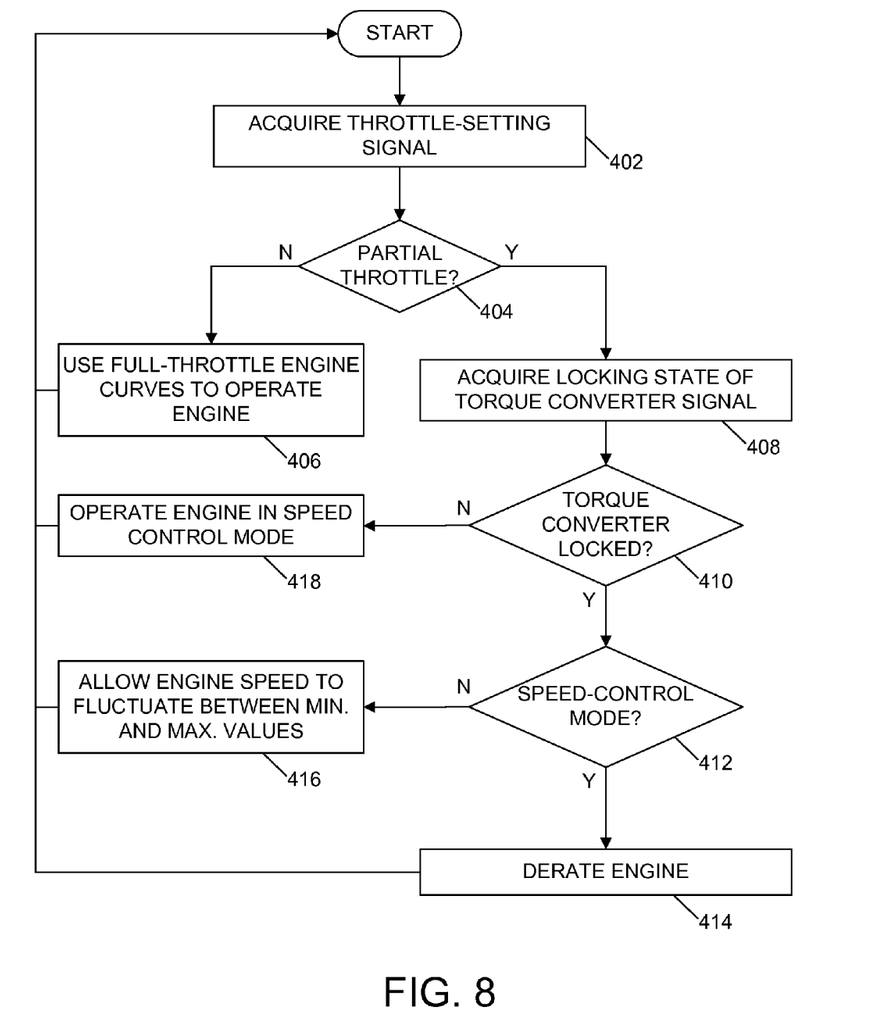
FIG. 8 is a flowchart of a method for reducing power variation in a powertrain during locking of a torque converter in accordance with the disclosure.

A flowchart for a method of controlling engine operation in a speed-control machine in accordance with one embodiment of the present disclosure is shown in FIG. 8. In reference to the flowchart, a throttle setting of the machine is acquired at 402. The throttle setting is considered at 404 to determine whether a full throttle or partial throttle setting has been commanded. When a full throttle has been commanded, the process continues at 406 where a full throttle engine curve is used to operate the engine, and the process repeats at 402 continuously for a subsequent throttle setting.

When a partial throttle command is determined to exist at 404, a signal indicative of a locking state of a torque converter is acquired at 408. The locking state of the torque converter is considered at 410 to determine whether the torque converter is locked, which indicates that the powertrain of the machine is operating in a direct-drive mode, or whether the torque converter is unlocked, which indicates that the powertrain of the machine is operating in a converter-drive mode. When the powertrain of the machine is operating in a direct-drive mode, a determination is made at 412 of whether the machine is operating in speed-control or load-control mode. When the machine is determined to be operating in a speed-control mode, the engine is derated at 414 by, at least in part, reducing the maximum torque or power capability of the engine. When the machine is determined to be operating in a load control mode at 412, the engine is operated by allowing the engine speed to fluctuate between minimum and maximum values at 416, which values can be predetermined or calculated based on one or more engine or machine operating parameters. Returning now to the determination at 410, when the machine is operating in a converter-drive mode, the engine is operated in a speed-control mode at 418.

The methods disclosed herein can be carried out by any appropriate mode and in any appropriate order. For example, the method for reducing power variation in a powertrain during a locking of a torque converter as described herein can be provided based on sensor information provided over a communication channel of the machine. Moreover, the various processes can be carried out by employing a processor within an electronic controller. The processor may be arranged for executing computer executable instructions stored on a tangible computer-readable medium, as is known.

It is noted that the foregoing systems and methods allow for flexibility in the machine operating mode where a selection of speed-control or load-control can be made. It should be understood, however, that for particular machine applications where full-time speed control is desired, the functionality relative to load-based control described herein can be omitted. Similarly, in machine applications where load-based control is desired, for example, when the torque converter is locked and the machine powertrain is operating in a direct drive mode, the speed-based functionality can be omitted.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A machine having a powertrain at least partially controlled by a throttle, the powertrain including an engine operably connected to a torque converter having a locking capability, the torque converter connected to a transmission having one or more selectable gear ratios, the machine comprising:

a switch associated with the torque converter and configured to provide a locking signal indicative of a locked or unlocked condition of the torque converter;

a throttle sensor associated with the throttle and configured to provide a throttle signal;

an electronic controller disposed to receive the locking signal and the throttle signal, the electronic controller configured to control operation of the engine at least partially based on the throttle signal and the locking signal, the electronic controller being configured to:

determine whether a locked or unlocked condition of the torque converter is present based on the locking signal;

determine whether a part throttle operating condition or a full throttle operating condition is present based on the throttle signal; and select a load-control power curve for the engine when the part throttle operating condition is present and when the torque converter switches from the unlocked to the locked condition.

2. The machine of claim 1, wherein the electronic controller further includes more than one load-control power curve, each power curve corresponding to a particular part throttle operating condition.

3. The machine of claim 2, wherein the controller selects the load-control power curve by interpolating between two derated power curves when a throttle setting is between the corresponding two particular part throttle operating conditions.

4. The machine of claim 2, wherein each of the load-control power curves includes a family of power curves corresponding to a particular part throttle operating condition, the family of power curves representing an allowable fluctuation of engine speed between corresponding minimum and maximum thresholds while a desired power corresponding to each particular throttle condition is maintained and while the torque converter is in a direct-drive mode.

5. The machine of claim 1, wherein a full throttle power curve is selected by the electronic controller when the throttle signal indicates that a full throttle operating condition is present.

6. The machine of claim 1, wherein selection of the load-control power curve corresponding to the part throttle operating condition results in a smaller power variation during a gear shift of the transmission as compared to a baseline power variation.

7. The machine of claim 1, wherein the electronic controller is configured to control the engine on an engine-load-based setting that is correlated to the throttle signal.

8. A method for reducing power variation in a powertrain during a shift from a converter-drive mode to a direct-drive mode, the powertrain including an engine connected to a transmission through a torque converter, the torque converter being configured to operate in an unlocked state during the converter-drive mode and in a locked state during the direct-drive mode, the transmission having one or more selectable forward and reverse gear ratios, the engine being controlled by an electronic controller, the method comprising:

providing a locking signal indicative of a locked or unlocked condition of the torque converter;

providing a throttle signal indicative of an engine throttle command;

receiving the locking and throttle signals in the electronic controller;

controlling operation of the engine with the electronic controller at least partially based on the locking and throttle signals by, at least partially:

determining whether a locked or unlocked condition of the torque converter is present based on the locking signal;

determining whether a part throttle operating condition or a full throttle operating condition is present based on the throttle signal; and selecting a load-control power curve for the part throttle operating condition when the torque converter switches from the unlocked to the locked condition.

9. The method of claim 8, wherein selecting the load-control power curve includes selecting a family of power curves corresponding to a particular part throttle operating condition based in part on the throttle signal, the family of power curves representing an allowable fluctuation of engine speed between corresponding minimum and maximum thresholds while a desired power corresponding to each particular throttle condition is maintained and while the torque converter is in a direct-drive mode.

10. The method of claim 9, wherein selecting the load-control power curve includes interpolating between two power curves when a throttle setting is between the corresponding two particular part throttle operating conditions.

11. The method of claim 9, wherein each of the family of power curves includes values such that the engine is derated and engine power is shifted towards higher engine speeds relative to a baseline engine curve, and wherein each of the family of power curves is correlated to the particular part throttle operating condition corresponding to each power curve.

12. The method of claim 8, wherein a full throttle power curve is selected when the throttle signal indicates that a full throttle operating condition is present.

13. The method of claim 8, wherein selecting the load-control power curve corresponding to the part throttle operating condition results in a smaller power variation during a gear shift of the transmission as compared to a baseline power variation.

14. The method of claim 8, further comprising controlling the engine based on an engine-load-based setting that is correlated to the throttle signal.

15. A method for reducing power variation in a powertrain during a locking of a torque converter, the powertrain including an engine connected to a transmission through the torque converter, the transmission having one or more selectable forward and reverse gear ratios, the engine being controlled by an electronic controller, the method comprising:

operably arranging a processor with a data storage device and a communication channel;

providing a locking signal indicative of a locked or unlocked condition of the torque converter over the communication channel;

providing a throttle signal indicative of an engine throttle command over the communication channel;

employing the processor executing computer executable instructions stored on a tangible computer-readable medium to implement processes including:

determining whether a locked or unlocked condition of the torque converter is present based on the locking signal;

determining whether a part throttle operating condition or a full throttle operating condition is present based on the throttle signal; and selecting a load-control power curve for the part throttle operating condition when the torque converter switches from the unlocked to the locked condition.

16. The method of claim 15, wherein the computer executable instructions stored on the tangible computer-readable medium include the further process of causing the load-control power curve to be selected from one of a plurality of power curves, the plurality of power curves including a load-control power curve corresponding to a particular part throttle operating condition.

17. The method of claim 15, wherein the computer executable instructions stored on the tangible computer-readable medium include the further process of interpolating between two power curves when a throttle setting is between the corresponding two particular part throttle operating conditions.

18. The method of claim 15, wherein the load-control power curve includes values such that the engine is derated and engine power is shifted towards higher engine speeds relative to a baseline engine curve, and wherein the computer executable instructions stored in the tangible computer-readable medium further include instructions for correlating each of the family of power curves with the throttle signal.

19. The method of claim 15, wherein the computer executable instructions stored on the tangible computer-readable medium include the further process of selecting a full throttle power curve when the throttle signal indicates that a full throttle operating condition is present.

20. The method of claim 15, wherein the computer executable instructions stored on the tangible computer-readable medium include the further process of controlling the engine based on an engine-load-based setting that is correlated to the throttle signal.

* * * * *